United States Patent [19]

Kohzai et al.

[11] 4,181,875
[45] Jan. 1, 1980

[54] DRIVE CIRCUIT FOR A DC MOTOR

[75] Inventors: Yoshinori Kohzai; Shigeki Kawada, both of Hino; Shigeaki Oyama, Hachioji, all of Japan

[73] Assignee: Fujitsu Fanuc Limited, Japan

[21] Appl. No.: 846,429

[22] Filed: Oct. 28, 1977

[30] Foreign Application Priority Data

Nov. 12, 1976 [JP] Japan .................. 51/135892

[51] Int. Cl.$^2$ .................................... H02K 23/08
[52] U.S. Cl. .................... 318/252; 310/181; 318/532
[58] Field of Search ............... 318/247, 246, 501, 493, 318/251, 338, 240, 521, 252, 351, 359, 424, 523, 532; 310/46, 154, 186, 181

[56] References Cited

U.S. PATENT DOCUMENTS

| | | | |
|---|---|---|---|
| 3,378,746 | 4/1968 | Weiser | 318/356 |
| 3,427,484 | 2/1969 | Harlby et al. | 310/181 |
| 3,586,941 | 6/1971 | Fujiwaki | 318/247 |
| 4,048,550 | 9/1977 | Harris | 318/356 |
| 4,079,278 | 3/1978 | Luneau | 310/154 |

Primary Examiner—Gene Z. Rubinson
Assistant Examiner—John W. Redman
Attorney, Agent, or Firm—Staas & Halsey

[57] ABSTRACT

A drive circuit for a DC motor provided with an armature having an armature winding and a plurality of field poles. The field poles are each composed of a main pole excited by a field winding and an auxiliary pole formed with a permanent magnet of the same polarity as the main pole. An armature current is shunted to supply a field current to the field winding connected in series to the armature. The field current remains zero until the armature current reaches a predetermined value, and increases with an increase in the armature current after the latter exceeds the predetermined value. As a result of this, in the region in which the armature current is small, that is, in the high-speed region of the motor, a torque larger than that of a DC series motor is obtained, and in the region in which the armature current is large, that is, in the low-speed region of the motor, a torque larger than that of a permanent magnet type DC motor is provided.

6 Claims, 6 Drawing Figures

DRIVE CIRCUIT FOR A DC MOTOR

BACKGROUND OF THE INVENTION

1. Field of the Invention

This invention relates to a drive circuit for a DC motor which is employed, for example, as a spindle motor of a machine tool.

2. Description of the Prior Art

It is desirable that a spindle motor provide a constant output over as wide a range of revolving speeds as possible.

In the prior art, a separately excited DC motor is employed and until its revolving speed reaches a base speed, the armature voltage is controlled to provide a constant torque, with the field current and the armature current held constant. In the speed range exceeding the base speed, the field current is controlled, providing a constant output. However, this method involves the use of a circuit for controlling the field current. Further, if the magnetic field is reduced to substantially zero, the motor's speed rises freely when no load is provided, so that the output cannot be maintained constant over a wide range.

In the case of a DC series motor, since the armature current is employed as a field current, no field control circuit is required. However, in the region in which the armature current is small, the torque output is small and provides a poor speed response in the high-speed region. Further, when the field current becomes zero in the case of no load, the armature speed reaches a runaway speed, which imposes a limitation on the controllable range of the armature current.

SUMMARY OF THE INVENTION

The object of this invention is to provide a DC motor drive circuit which is adapted to provide a torque larger than that of a DC series motor in the region of small armature currents and a torque larger than that of a permanent magnet field type DC motor in the region of large armature currents.

Another object of this invention is to provide a DC motor drive circuit of simple construction.

DESCRIPTION OF THE PREFERRED EMBODIMENTS

Figure 1:
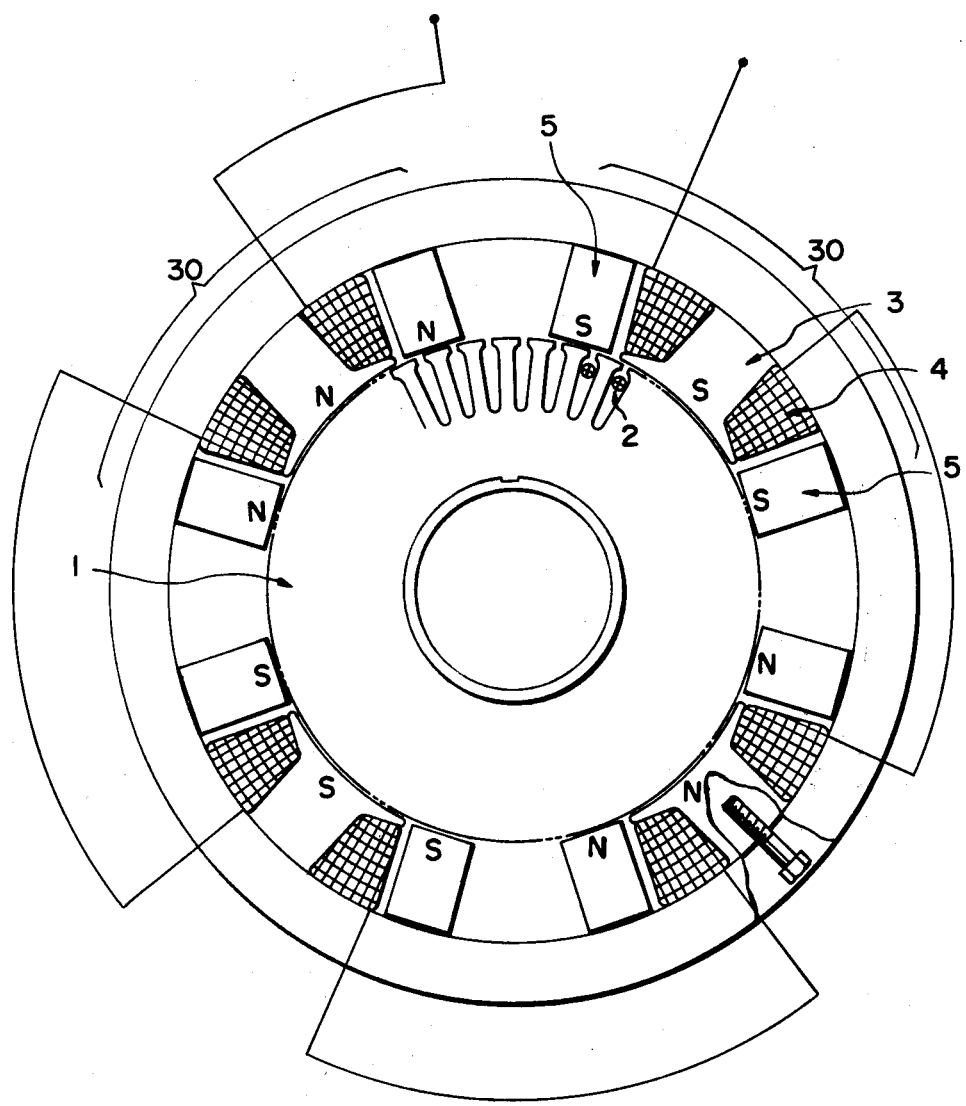
FIG. 1 is a schematic diagram showing in section a DC motor driven by the drive circuit of this invention.

FIG. 1 shows in section a DC motor M which is driven by the circuit of this invention. In FIG. 1, reference numeral 1 indicates an armature having an armature winding 2, and 30 designates field poles, each composed of a main pole 3 excited by a field winding 4 and an auxiliary pole 5 formed with a pair of permanent magnets disposed on both sides of the main pole 3 and having the same polarity as the main pole.

Figure 2:
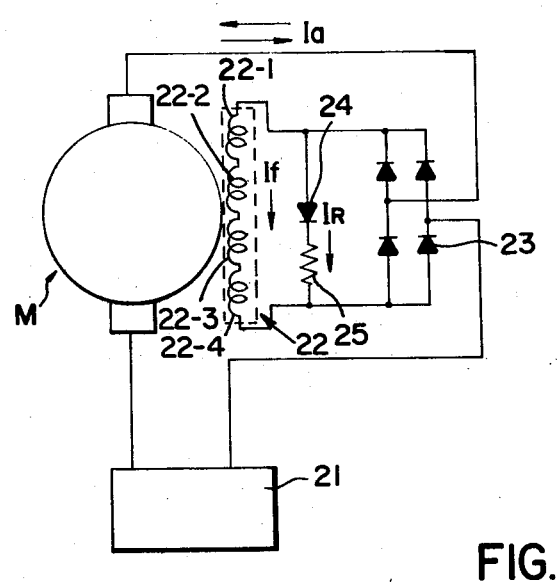
FIG. 2 is a circuit diagram illustrating an embodiment of the drive circuit of this invention.
Figure 4:
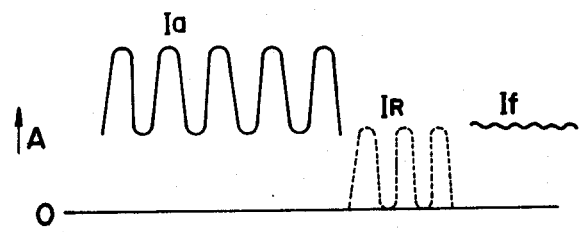
FIG. 4 shows waveforms in the embodiment of FIG. 2.

FIG. 2 illustrates an embodiment of the drive circuit of this invention for the DC motor M depicted in FIG. 1. Reference numeral 21 identifies a thyristor controller power supply which rectifies an alternating current from an AC power source (not shown) to obtain a ripple, as illustrated in FIG. 4. Reference numeral 22 represents the field winding indicated by 4 in FIG. 1, with the individual windings being designated 22-1, 22-2, 22-3, and 22-4. The field winding 4 is connected in series to the armature of the DC motor M. Reference numeral 23 denotes a rectifier composed of diodes for retaining the direction of flow of a field current If unchanged regardless of the polarity of the output voltage of the power supply 21. To the field winding 22 is connected in parallel a shunt circuit formed with a series connection of a diode 24 and a resistor 25.

Figure 3:
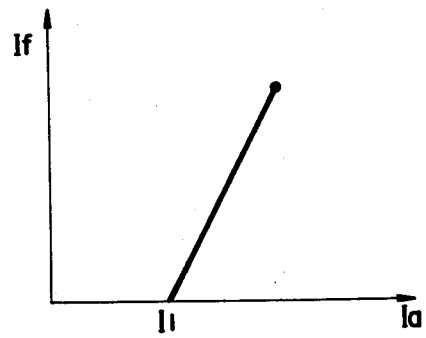
FIG. 3 is a graph showing the relationship between an armature current and a field current in the drive circuit of this invention.

FIG. 3 shows the relationship between an armature current Ia and the field current If in the case of employing the drive circuit of this invention. Where the armature current Ia is less than a certain value $I_1$, the field current If is zero and when the armature current Ia is in excess of the aforesaid value $I_1$, the current If increases linearly.

Namely, the output waveform of the power supply 21 in FIG. 2 is a ripple waveform and the armature current Ia has the waveform depicted in FIG. 4. On the other hand, since the field current If exhibits resistance to the ripple due to the winding impedance, it becomes a direct current of a level substantially corresponding to the trough of the armature current Ia, as indicated by If in FIG. 4. The current shunting in the series circuit of the diode 24 and the resistor 25 is the ripple component of the armature current Ia.

As the armature current Ia increases, the field current If also increases but when the armature current Ia decreases to reduce its DC components to zero, the field current If becomes zero.

That is, when the armature current Ia is smaller than the value $I_1$, the DC motor serves as a permanent magnet field type DC motor and when the current Ia is larger than the value $I_1$, the DC motor functions as such a DC motor that the field is controlled by the permanent magnet and the field current.

Figure 5:
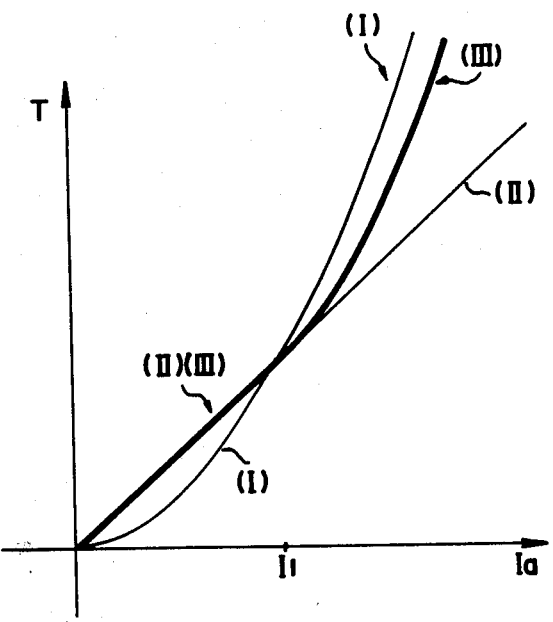
FIG. 5 is a graph showing the relationships between an armature current and torque in various DC motors.

FIG. 5 is a graph showing the relationships between the armature current Ia and the torque T in various types of DC motors.

In the permanent magnet field type DC motor, $$T = k_1 . Ia \qquad (1)$$

where $k_1$ is a constant. In this case, the characteristic indicated by (II) in FIG. 5 is obtained.

In a DC series motor, $$T = k_2 . If . Ia = K_2 . Ia^2 \qquad (2)$$

where $k_2$ is a constant and If is a field current. The characteristic indicated by (I) in FIG. 5 is resulted.

With the drive system of this invention, $$T = k_1 . Ia + k_2 . If . Ia \qquad (3)$$

The characteristic indicated by (III) in FIG. 5 is obtained.

In accordance with this invention, in the region in which the armature current Ia is small, that is, in the high-speed region, a torque larger than that of the series motor is obtained, and in the region in which the current Ia is large, that is, in the low-speed region, a torque larger than that of the permanent magnet field type DC motor is obtained.

Figure 6:
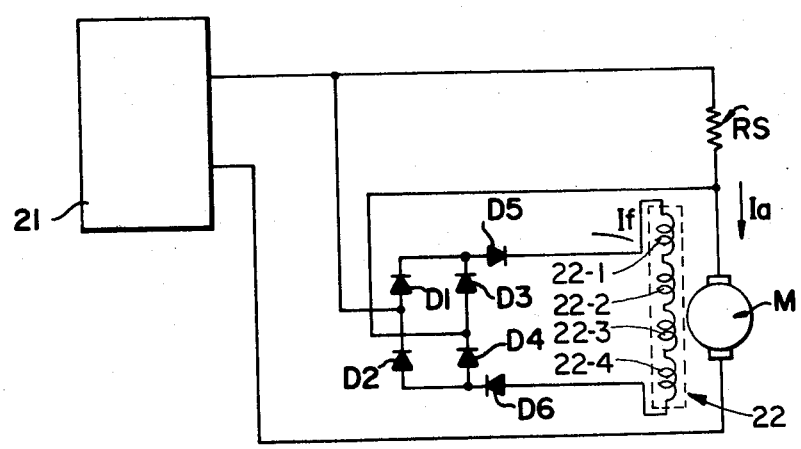
FIG. 6 is a circuit diagram illustrating another embodiment of the drive circuit of this invention.

FIG. 6 shows another embodiment of the drive circuit of this invention.

In the illustrated embodiment, a shunt resistor RS is connected in series to the armature and the voltage across the resistor RS is applied to a rectifier composed of diodes $D_1$ to $D_4$. The rectifier is connected to a field winding 22 through diodes $D_5$ and $D_6$. Accordingly, when the armature current Ia flows in the direction indicated by the arrow, the field current If does not flow until the voltage across the resistor RS exceeds the sum total of the forward diode voltages of the diodes $D_1$, $D_5$, $D_6$ and $D_4$. When the voltage across the resistor RS exceeds the aforesaid sum total of the forward diode voltages, the field current If increases with an increase in the armature current Ia, providing the characteristic shown in FIG. 3.

It will be apparent that many modifications and variations may be effected without departing from the scope of the novel concepts of this invention.

What is claimed is:

1. A drive circuit for a DC motor having field poles, each composed of a main pole excited by a field winding and with a permanent magnet auxiliary pole, and an armature having an armature winding, wherein the armature winding is connected to the field winding through a rectifier, and wherein a field current is zero when an armature current is less than a predetermined value, and increases or decreases with an increase or decrease in the armature current when the armature current is larger than the predetermined value.

2. A drive circuit for a DC motor having an armature and a plurality of field windings, comprising:
   means for supplying electrical energy to said armature and said field windings; and
   control means responding to the current in said armature for holding the current in said field windings substantially at zero when the current in said armature is less than a predetermined value, and for linearly varying the current in said field windings when the current in said armature exceeds said predetermined value.

3. The drive circuit of claim 2, wherein said control means comprises a diode series-connected to a resistor, said diode and resistor being connected across said field windings.

4. The drive circuit of claim 2, wherein said control means comprises at least one diode in series with said field windings, and at least one resistor in series with said armature.

5. The drive circuit of claim 3, further comprising a rectifier connected between said armature and said field windings.

6. The drive circuit of claim 4, further comprising a rectifier connected between said armature and said field windings.

* * * * *

UNITED STATES PATENT AND TRADEMARK OFFICE
CERTIFICATE OF CORRECTION

PATENT NO. : 4,181,875
DATED : Jan. 1, 1980
INVENTOR(S) : Yoshinori Kohzai et al.

It is certified that error appears in the above-identified patent and that said Letters Patent are hereby corrected as shown below:

Column 2, equations (1), (2), and (3), all of the "." should be raised above the line --·-- to represent a multiplication sign.

Signed and Sealed this

Twentieth Day of May 1980

[SEAL]

Attest:

SIDNEY A. DIAMOND

Attesting Officer

Commissioner of Patents and Trademarks